United States Patent [19]

Ponsen et al.

[11] 3,934,167

[45] Jan. 20, 1976

[54] GASEOUS ELECTRIC DISCHARGE TUBE HAVING A COAXIAL, HOLLOW CATHODE STRUCTURE

[75] Inventors: Gijsbert Johannes Ponsen, Eindhoven; Wilhelmus Jacobus Witteman, Geldrop, both of Netherlands

[73] Assignee: U.S. Philips Corporation, New York, N.Y.

[22] Filed: Oct. 1, 1974

[21] Appl. No.: 511,077

Related U.S. Application Data

[63] Continuation of Ser. No. 332,121, Feb. 13, 1973, abandoned.

[30] Foreign Application Priority Data

Apr. 24, 1970 Netherlands ....................... 7005965

[52] U.S. Cl. ................ 313/185; 313/186; 313/207; 313/209; 313/318; 331/94.5 D

[51] Int. Cl.² .................... H01J 61/067; H01J 61/12; H01S 3/02

[58] Field of Search ........... 313/209, 206, 207, 217, 313/218, 185, 186; 331/94.5 G, 94.5 D

[56] References Cited

UNITED STATES PATENTS

| | | | |
|---|---|---|---|
| 1,877,716 | 9/1932 | Claude | 313/207 X |
| 3,390,297 | 6/1968 | Vollmer | 313/209 |
| 3,563,655 | 2/1971 | Johnson | 313/209 X |
| 3,745,483 | 7/1973 | Huchital et al. | 331/94.5 G |

*Primary Examiner*—Palmer C. Demeo
*Attorney, Agent, or Firm*—Frank R. Trifari

[57] ABSTRACT

In an electric discharge tube, for example, for an argon ion laser, the cathode is formed by a double-walled tube of tantalum or tungsten, the inner tube of which is the shorter. Under the influence of the discharge in the order of 100 A, said inner tube starts glowing. An auxiliary anode may be present near the end of the cathode.

3 Claims, 1 Drawing Figure

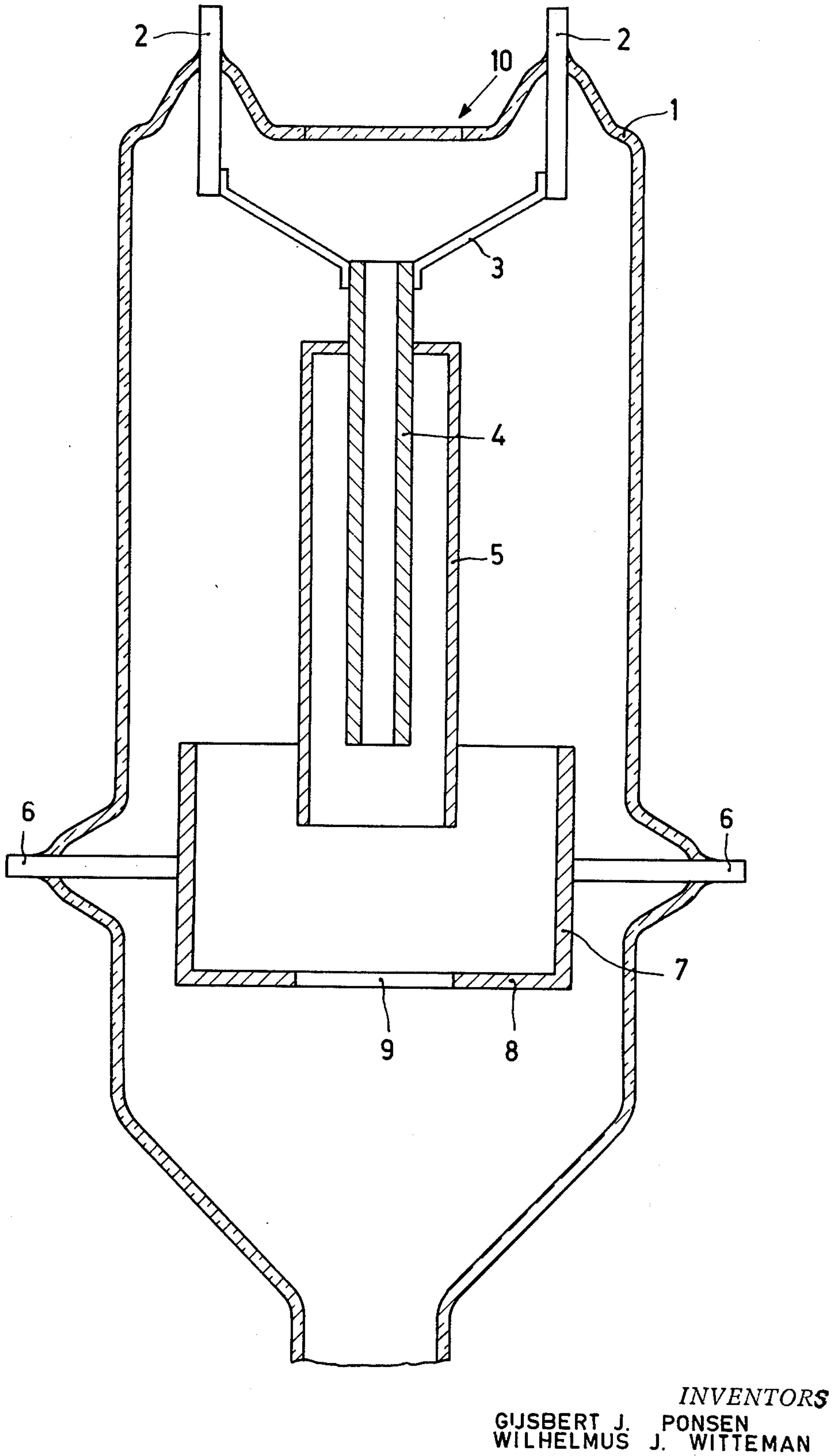
INVENTORS
GIJSBERT J. PONSEN
WILHELMUS J. WITTEMAN
BY
AGENT

GASEOUS ELECTRIC DISCHARGE TUBE HAVING A COAXIAL, HOLLOW CATHODE STRUCTURE

This is a continuation of application Ser. No. 332,121, filed Feb. 13, 1973, now abandoned.

The invention relates to an electric discharge tube comprising a gas filling and a hollow non-activated cathode in the form of a cylinder which is open at least at one end.

Hollow, non-activated cathodes are used, inter alia, in discharge tubes for infrared lasers the gas filling of which consists of carbon dioxide and nitrogen with one or more other gases. The electrodes described in British Patent Specification 1,087,803 consist of platinum sleeves in separate side tubes, which sleeves have a comparatively small aperture for the discharge. In British Patent Specification 1,155,000 the cathode consists of a nickel foil in the form of a cylinder clamped against the wall of the discharge space. In British patent specification 1,158,977 platinum is used for this foil. In the discharge tubes described in these three papers the current density at the cathode is in the order of 10 mA/sq.cm.

In applications in which higher currents are required, for example, in argon ion lasers in which the current density at the cathode may be 10A/sq.cm and higher, these known cathodes are unsuitable because of the restricted life thereof.

From Dutch patent application 6,514,113 laid open to public inspection, hollow cathodes are also known for currents up to in the order of 100 A, in which a low pressure prevails in the main discharge space and the ignition is effected inside the hollow cathode where the pressure is higher. In the devices described, the discharge space is being pumped constantly and fresh gas admitted to remove the impurities in the gas filling which are released during the electron bombardment of articles placed on the anode for treatment. The cathode consists of a tube of tantalum of 1.5 mm inside diameter and the discharge acts substantially entirely on the outside. A strong evaporation and sputtering of the cathode occurs, which in this application need not be a drawback.

In most other applications of hollow cathodes, the ignition of the discharge inside the cathode is not possible and the sputtering and evaporation constitute a great drawback.

In the I.E.E.E. Journal of Quantum Electronics QE3 (no 9), 398 – 399, 1967 and in the Rev. Sci. Inst. 39, 1472 – 1477, 1968 there has been described an argon in laser ion which the cathode consists of a hollow tantalum tube surrounded by an electrically floating indication shield. The anode is a similar tube about 20 centimeters, remote from the cathode. The laser is of the flowing gas type and the flow is increased for starting the discharge, whereafter the pressure is lowered. The cathode tube with a length of 8 cm and a diameter of 5 mm gave a discharge current of about 20 A at a pressure of 0.009 Torr argon. The life of the cathode was about 20 hours.

It is the object of the invention to provide a construction which can give better results for a number of applications.

According to the invention, in an electric discharge tube comprising a gas filling and a hollow nonactivated cathode in the form of a cylinder which is open at least at one end, the cathode consists of two tubes of tantalum or tungsten located coaxially one in the other and which are open at the end facing the discharge, the inner tube ending within the outer tube and the two tubes being connected together and to the cathode support at the other end.

In connection with the hollow cathode effect, the discharge in the case of none too large currents will mainly act upon the inner tube which, in the case of sufficiently large current density, starts glowing so that thermal electron emission occurs. The outer tube does not only fulfil the function of a screen against sputtering and evaporation but it moreover screens the inner tube so that the temperature can increase to a higher value than would be the case without an outer tube.

The discharge will start in the space between the two tubes and when the inner tube becomes hot the discharge will transfer to the inner side thereof. This type of starting is possible at the low pressure of the sealed off tube, in contradistinction to the starting at high pressure of the known device with the single walled cathode.

The diameters of the tubes are in the order of from 3 to 8 mm and from 10 to 20 mm, respectively, with a length in the order of 50 mm. The inner tube ends at a distance of 1 to 1½ times its diameter from the outer tube.

From such cathodes, currents can be drawn in argon at a pressure in the order of from 0.05 to 5 Torr in which a cathode drop of approximately 20 volts occurs at currents of tenths of an amp. The life of the cathode will be a few hundred hours.

For effecting the ignition, the discharge tube may be provided with an auxiliary anode consisting of a cylindrical sleeve which is entirely open at one end and is arranged at a distance to the outer tube approximately equal to the diameter thereof, and the bottom of which has an aperture with a diameter approximately equal to that of the outer tube. This obviates the necessity of higher pressures for starting the tube.

In order that the invention may be readily carried into effect, it will now be described in greater detail, by way of example, with reference to the accompanying drawing, the sole FIGURE of which shows the cathode compartment of a discharge tube according to the invention.

Two tungsten pins 2 in the quartz wall 1 support by means of the supports 3 the cathode which consists of an inner tube 4 and an outer tube 5 connected by a flange. The material of the cathode is tantalum. Two pins 6 sealed in the side wall of 1, support the auxiliary anode which consists of a cylindrical part 7 and a flat part 8 having therein an aperture 9. This auxiliary anode consists of tantalum.

When the cathode compartment forms part of the discharge tube of 1 cm diameter of an argon ion laser, it is filled with argon at a pressure of 0.2 Torr and a cathode current is obtained of, for example, 100 A with a total arc voltage of 100 volts (with an arc length of approximately 50 cm). The cathode drop then is between 15 and 20 volts. The temperature of the inner tantalum tube increases at the end to above 2500°C. Opposite to the cathode, the inner tube 4 of which is entirely open, the quartz wall 1 comprises an optic plane parallel window 10 for passing the laser radiation.

What is claimed is:

1. In a discharge tube having an anode and a cathode the improvement which comprises a generally cylindrical cathode having disposed thereabout in coaxial relationship a generally cylindrical auxiliary anode, said auxiliary anode having a diameter greater than said cathode and disposed with a first axial end portion overlapping a first axial end portion of said cathode, said auxiliary anode having an axial portion extending closer to the anode than said cathode to provide shielding for said cathode, said discharge tube being provided with an argon filling at a pressure between 0.05 and 5 Torr at a cathode current in the order of tenths of amperes, said cathode being non-activated and comprising inner and outer tubes of a material selected from the group consisting of tantalum and tungsten, said inner and outer tubes being disposed in coaxial relationship with at least a first axial extremity of said outer tube overlapping a first axial extremity of said inner tube, said inner and outer tubes being open at said first axial extremity which faces the discharge, the first axial extremity of said inner tube ending within the first axial extremity of the outer tube and the outer tube being carried on the circumference of the inner tube, and means for supporting said inner tube carried on said discharge tube.

2. Apparatus as described in claim 1 wherein said first axial extremity of said inner tube terminates at a distance 1 to 1 ½ times its own diameter from the first axial extremity of the outer tube.

3. Apparatus as described in claim 2 wherein the first axial extremity of said auxiliary anode is disposed at an axial distance to said first axial extremity of said outer tube which is substantially equal to the diameter thereof, one end thereof proximate to said cathode being open, and the other end thereof having a wall defining an aperture with a diameter substantially equal to that of said outer tube.

* * * * *

UNITED STATES PATENT AND TRADEMARK OFFICE
CERTIFICATE OF CORRECTION

PATENT NO. : 3,934,167
DATED : January 20, 1976
INVENTOR(S) : GIJSBERT J. PONSEN ET AL It is certified that error appears in the above-identified patent and that said Letters Patent are hereby corrected as shown below:

Section [63] "Continuation of Sr. No. 332,121, Feb. 13, 1973, Abandoned."

should be

--Continuation of Ser. No. 332,121, Feb. 13, 1973, Abandoned, which was a Continuation of Ser. No. 136,076, April 21, 1971, Abandoned.--

Column 1, line 51, "in laser ion" should be --ion laser in--.

Signed and Sealed this

Twenty-first Day of September 1976

[SEAL]

*Attest:*

RUTH C. MASON
*Attesting Officer*

C. MARSHALL DANN
*Commissioner of Patents and Trademarks*